(12) United States Patent
Kupratis et al.

(10) Patent No.: US 11,597,527 B2
(45) Date of Patent: *Mar. 7, 2023

(54) AIRCRAFT HYBRID PROPULSION FAN DRIVE GEAR SYSTEM DC MOTORS AND GENERATORS

(71) Applicant: Raytheon Technologies Corporation, Farmington, CT (US)

(72) Inventors: Daniel Bernard Kupratis, Wallingford, CT (US); Frederick M. Schwarz, Glastonbury, CT (US); William G. Sheridan, Southington, CT (US); Glenn Levasseur, Colchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/376,675

(22) Filed: Jul. 15, 2021

(65) Prior Publication Data

US 2021/0339880 A1 Nov. 4, 2021

Related U.S. Application Data

(62) Division of application No. 16/039,849, filed on Jul. 19, 2018, now Pat. No. 11,091,272.

(51) Int. Cl.
*F02C 6/14* (2006.01)
*B64D 27/24* (2006.01)
*B64D 27/10* (2006.01)
(Continued)

(52) U.S. Cl.
CPC ............. *B64D 27/24* (2013.01); *B64D 27/10* (2013.01); *F01D 15/10* (2013.01); *F02C 6/14* (2013.01);
(Continued)

(58) Field of Classification Search
CPC ...... F02C 6/14; F02C 6/02; F02C 7/36; F02C 3/107; B64D 2027/026; B64D 27/24;
(Continued)

(56) References Cited

U.S. PATENT DOCUMENTS 9,764,848 B1 9/2017 Vondrell et al.
10,794,216 B2 * 10/2020 Kupratis ................... F02K 3/06
(Continued)

OTHER PUBLICATIONS

European Search Report for European Application No. 19187436.1 dated Dec. 11, 2019.

*Primary Examiner* — Thomas P Burke
(74) *Attorney, Agent, or Firm* — Carlson, Gaskey & Olds, P.C.

(57) ABSTRACT

An aircraft propulsion system is disclosed and includes a first gas turbine engine including a first input shaft driving a first gear system, a first fan driven by the first gear system, a first generator supported on the first input shaft and a fan drive electric motor providing a drive input to the first fan, a second gas turbine engine including a second input shaft driving a second gear system, a second fan driven by the second gear system, a second generator supported on the second input shaft and a second fan drive electric motor providing a drive input to the second fan and a controller controlling power output from each of the first and second generators and directing the power output between each of the first and second fan drive electric motors.

12 Claims, 8 Drawing Sheets

(51) Int. Cl.
*F01D 15/10* (2006.01)
*F02C 7/36* (2006.01)
*H02K 7/18* (2006.01)
*B64D 27/02* (2006.01)
*F02C 6/02* (2006.01)
*F02C 3/107* (2006.01)

(52) U.S. Cl.
CPC ............ *F02C 7/36* (2013.01); *H02K 7/1823* (2013.01); *B64D 2027/026* (2013.01); *B64D 2221/00* (2013.01); *F02C 3/107* (2013.01); *F02C 6/02* (2013.01); *F05D 2220/76* (2013.01); *F05D 2260/42* (2013.01); *F05D 2270/053* (2013.01)

(58) Field of Classification Search
CPC ................ F01D 15/10; H02K 7/1823; F05D 2220/762; F05D 2270/13
See application file for complete search history.

(56) References Cited

U.S. PATENT DOCUMENTS

| | | | |
|---|---|---|---|
| 11,091,272 B2* | 8/2021 | Kupratis | F02C 6/00 |
| 2004/0255590 A1* | 12/2004 | Rago | F02C 7/36 |
| | | | 60/793 |
| 2016/0130970 A1* | 5/2016 | Blazer | H02P 25/03 |
| | | | 290/7 |
| 2016/0355272 A1 | 12/2016 | Moxon | |
| 2017/0275009 A1 | 9/2017 | Huang | |
| 2018/0002025 A1 | 1/2018 | Lents et al. | |
| 2018/0163558 A1 | 6/2018 | Vondrell et al. | |
| 2018/0291807 A1 | 10/2018 | Dalal | |
| 2018/0339780 A1 | 11/2018 | Barone et al. | |
| 2018/0354632 A1* | 12/2018 | Hon | F02C 7/262 |
| 2018/0367017 A1* | 12/2018 | Turvey | H02K 7/1823 |
| 2019/0323426 A1* | 10/2019 | Mackin | B64D 27/10 |

* cited by examiner

AIRCRAFT HYBRID PROPULSION FAN DRIVE GEAR SYSTEM DC MOTORS AND GENERATORS

CROSS REFERENCE TO RELATED APPLICATION

This application is a divisional of U.S. application Ser. No. 16/039,849 filed on Jul. 19, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Incorporation of electric power in gas turbine engines is currently substantially limited to accessory components. Advances in electric motors and generators along with demands for ever increasing engine operating efficiencies warrant consideration of alternate engine configurations.

Geared architectures have improved propulsive efficiency and prompted turbine engine manufacturers to seek further improvements to engine performance including improvements to propulsive efficiencies.

SUMMARY

An aircraft propulsion system according to an exemplary embodiment of this disclosure includes, among other possible things, a first gas turbine engine including a first input shaft driving a first gear system, a first fan driven by the first gear system, a first generator supported on the first input shaft and a fan drive electric motor providing a drive input to the first fan, a second gas turbine engine including a second input shaft driving a second gear system, a second fan driven by the second gear system, a second generator supported on the second input shaft and a second fan drive electric motor providing a drive input to the second fan and a controller controlling power output from each of the first and second generators and directing the power output between each of the first and second fan drive electric motors.

In a further embodiment of the foregoing aircraft propulsion system, the first and second gear systems provide a main drive input to a corresponding one of the first and second fans. The first and second fan drive electric motors provide a supplemental drive input to at least one of the first and second fans.

In a further embodiment of any of the foregoing aircraft propulsion system, the controller is configured to balance power generated by both the first and second generators between the first fan drive electric motor and the second fan drive electric motor responsive to an imbalance between the main drive input of one of the first gas turbine engine and the second gas turbine engine.

In a further embodiment of any of the foregoing aircraft propulsion system, the controller is configured to direct power generated by each of the first and second generators independent of the other of the first and second generators to one or both of the first fan drive electric motor and the second fan drive electric motor.

In a further embodiment of any of the foregoing aircraft propulsion system, each of the first generator and the second generator includes a rotor supported on the corresponding one of the first and second input shafts and a stator disposed on a static structure relative to the rotor.

In a further embodiment of any of the foregoing aircraft propulsion system, each of the first and second generators includes a first stator and a first rotor including a first set of poles providing power to a first phase of the fan drive electric motor. A second stator and a second rotor including a second set of poles provides power to a second phase of the fan drive electric motor.

In a further embodiment of any of the foregoing aircraft propulsion system, the first and second fan drive electric motors are electrically coupled to the corresponding one of the first stator and the second stator. The first set of poles and the second set of poles are clocked relative to each other such that rotation of the input shaft commutates the first phase and the second phase to drive the fan drive electric motor.

In a further embodiment of any of the foregoing aircraft propulsion system, the first and second fan drive electric motor includes a permanent magnet rotor mounted to a fan shaft. The permanent magnet rotor includes a plurality of poles corresponding with the first set of poles and the second set of poles of both the first and second generators.

In a further embodiment of any of the foregoing aircraft propulsion system, the first and second gear systems are configured to provide a ratio between an input speed of a corresponding one of the first and second input shafts and an output speed of the corresponding fan shaft. Commutation of the plurality of poles of the first and second fan drive electric motors corresponds with the gear ratio and the number of poles in each of the first set of poles and the second set of poles.

In a further embodiment of any of the foregoing aircraft propulsion system, for each of the first and second generators, the first rotor is spaced axially apart from the second rotor on the corresponding one of the first and second input shafts.

In a further embodiment of any of the foregoing aircraft propulsion system, each of the first and second generators includes a third rotor including a third set of poles and a third stator. Each of the first and second fan drive electric motors includes poles corresponding to each of the first, second and third set of poles of each of the first and second generators.

In a further embodiment of any of the foregoing aircraft propulsion system, at least one battery coupled to the first and second generators is included. The first and second generators provide electric power to charge at least one battery.

Another aircraft propulsion system according to an exemplary embodiment of this disclosure includes, among other possible things, at least two gas turbine engines each including a fan driven by a fan shaft rotatable about an engine axis, a fan drive electric motor providing a supplemental drive input to the fan, a gear system driven by an input shaft and coupled to the fan shaft to provide a main drive input for driving the fan, and a generator means driven by the input shaft configured to generate electric power and for driving the fan drive electric motor; and a controller controlling power output from the generator of each of the at least two gas turbine engines and directing power to at least one of the fan drive electric motor of the at least two gas turbine engines.

In a further embodiment of the foregoing aircraft propulsion system, the generator means includes a first stator and a first rotor including a first set of poles providing electric power to a first phase of the fan drive electric motor and a second stator and a second rotor including a second set of poles providing power to a second phase of the fan drive electric motor.

In a further embodiment of any of the foregoing aircraft propulsion system, the first set of poles and the second set of poles are clocked relative to each other such that rotation of the input shaft commutates the first phase and the second phase to drive the fan drive electric motor.

In a further embodiment of any of the foregoing aircraft propulsion system, the generator means includes a third stator and a third rotor including a third set of poles providing electric power to a third phase of the fan drive electric motor. The first, second and third set of poles are clocked relative to each other such that rotation of the input shaft commutates the first phase, second phase and third phase of the fan drive electric motor.

In a further embodiment of any of the foregoing aircraft propulsion system, the gear system is configured to provide a ratio between an input speed of the input shaft and an output speed of the fan shaft. Commutation of the plurality of poles of the fan drive electric motor corresponds with the gear ratio and the number of poles in each of the first set of poles and the second set of poles.

In a further embodiment of any of the foregoing aircraft propulsion system, the controller is configured to balance power generated by the generator of each of the at least two gas turbine engines to distribute electric power between to the fan drive electric motor of each of the at least two gas turbine engines responsive to an imbalance between the main drive input of one of the at least two gas turbine engines.

A method of operating an aircraft propulsion system according to an exemplary embodiment of this disclosure includes, among other possible things, generating electric energy with a generator mounted to an input shaft driving a gear system at a first speed in each of a first gas turbine engine and a second gas turbine engine, driving a fan shaft of each of the first and second gas turbine engine at a second speed different than the first speed with a primary rotational input from the corresponding gear system and driving the fan shaft with a supplemental rotational input with a fan drive electric motor driven by electric energy generated by the generator disposed on the input shaft of at least one of the first and second gas turbine engines and distributing electric power generated from the generator of each of the first and second gas turbine engines through an electric network to at least one fan drive electric motor of the first and second turbine engines.

In a further embodiment of the foregoing method of operating an aircraft propulsion system, the generator comprises a first generator portion providing electric power to a first phase of the fan drive electric motor and a first battery, and a second generator providing electric power to a second phase of the fan drive electric motor and a second battery.

In a further embodiment of any of the foregoing methods of operating an aircraft propulsion system, the generator includes a third generator portion providing electric power to a third phase of the fan drive electric motor and third battery.

In a further embodiment of any of the foregoing methods of operating an aircraft propulsion system, commutating electric power provided to at least the first phase and second phase of the electric motor by clocking a first set of poles of first generator portion relative to a second set of poles of the second generator portion is included.

In a further embodiment of any of the foregoing methods of operating an aircraft propulsion system, engaging the supplemental rotational input with the fan drive electric motor responsive to a decreased load on a fan drive turbine is included to drive the input shaft of one of the first and second gas turbine engines with electric power from a generator of each of the first and second gas turbine engines.

In a further embodiment of any of the foregoing methods of operating an aircraft propulsion system, distributing electric power to the fan drive electric motor of each of the first and second gas turbine engines responsive to different loads on the fan drive turbine to balance loads on the fan drive turbine between the first and second gas turbine engines.

In a further embodiment of any of the foregoing methods of operating an aircraft propulsion system, commutating the electric power provided to at least the first phase and second phase of the electric motor is included by charging and discharging at least one of a first battery and a second battery.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
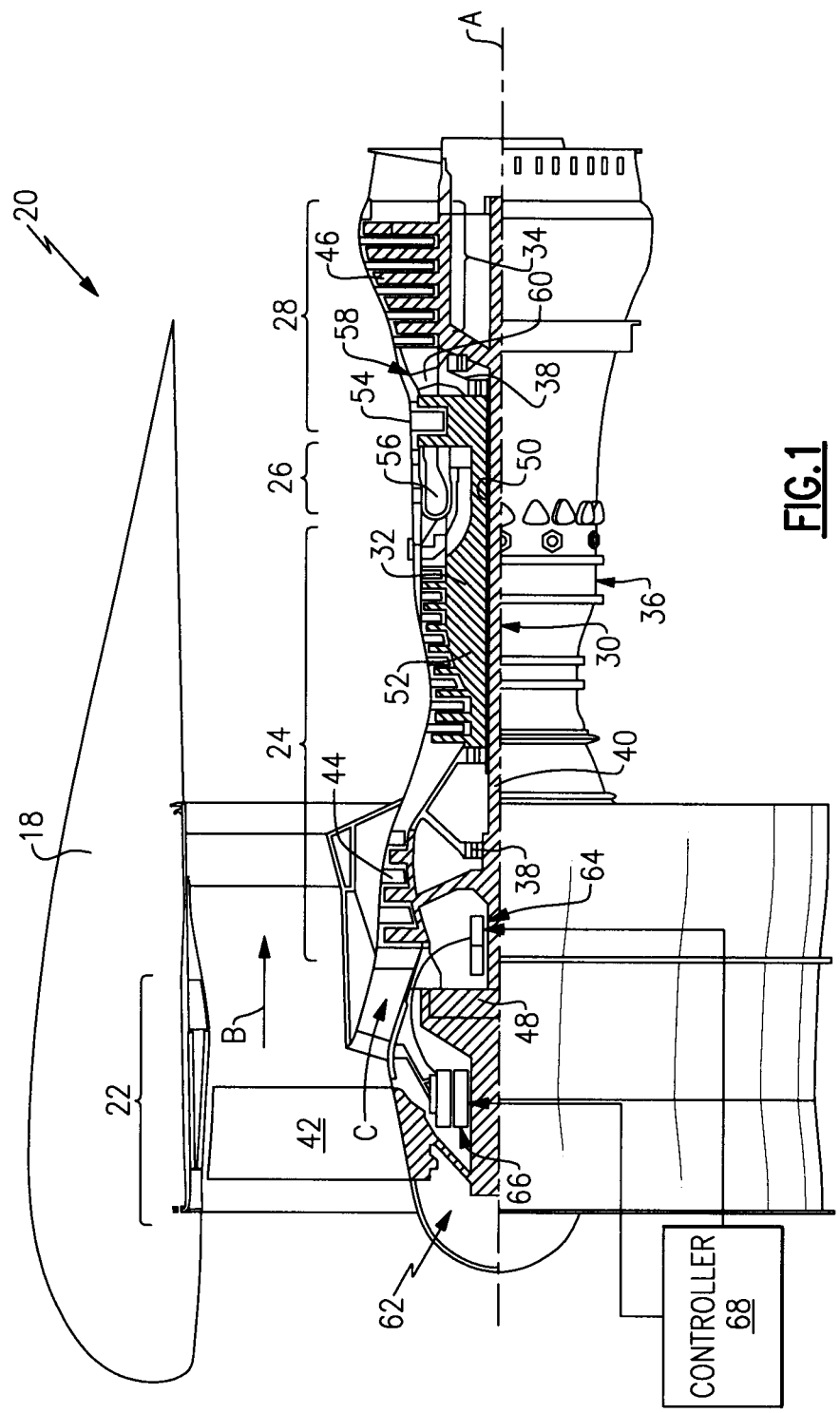
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Changes in environmental conditions can require constant adaptations and adjustments to engine operation to provide a desired propulsive output. For example, fuel flow to the combustor 56 may be adjusted depending both on a desired propulsive power output and input airflow characteristics including pressure and temperatures. Changes in input airflows may change during operation and require adjustment of fuel flow to maintain the desired propulsive output. There is a certain lag between the adjustment and obtaining the operating propulsive output. Although very brief, the lag can affect engine efficiency.

Moreover, changes in power provided by the low pressure turbine 46 driving fan section 22 also will add power to the low pressure compressor 44 and thereby complicate operation. The low pressure compressor 44 matches operation to that of the high pressure compressor 52 and thereby any adjustment to one results in changes to the other. Excessive power input into the low pressure compressor 44 may require that air flow be bled off in order to properly match operation of the high pressure compressor 52.

The disclosed gas turbine engine 20 includes a fan drive system 62 that includes a fan drive electric motor 66 that is driven by a generator 64 driven by the low shaft 40. The generator 64 generates electric power that is controlled by a controller 68 to add power to the fan section 22 parallel to the power provided through the geared architecture 48. Accordingly, the fan drive system 62 enables additional power to be added to drive the fan section 22 to supplement power provided through mechanical means from the fan drive low pressure turbine 46. The fan drive electric motor 66 is more responsive to changes in power demand and thereby can reduce fluctuation in fan operation generated by lags in power transmitted through the mechanical means of the geared architecture 48.

Figure 2:
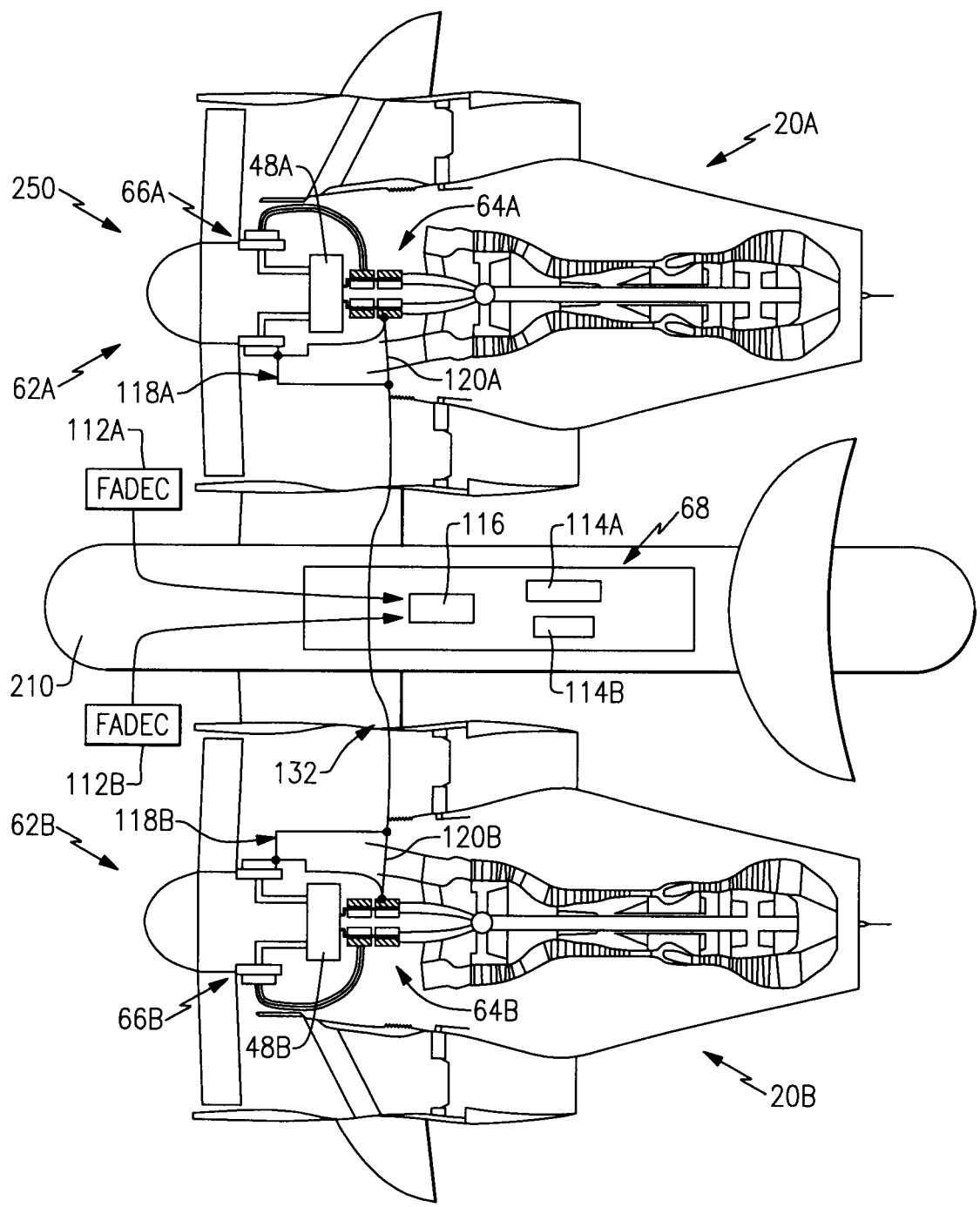
FIG. 2 is a schematic view of an example aircraft propulsion system.

Referring to FIG. 2 with continued reference to FIG. 1, an aircraft propulsion system 250 for an aircraft 210 is schematically shown and includes a first gas turbine engine 20A and a second gas turbine engine 20B. Each of the first and second gas turbine engines 20A-B are configured substantially the same and include corresponding electric fan drive systems 62A-B that are controlled by the common controller 68. The first engine 20A includes a first generator 64A that is driven by a first gear system 48A to provide power to a first fan drive electric motor 66A. The second engine 20B includes a second generator 64B that is driven by a second gear system 48B to provide power to a first fan drive electric motor 66A.

The first and second generators 64A-B along with the first and second fan drive electric motors 62A-B are electrically coupled through an electric network 132 such that electric power may be distributed from both of the generators 64A-B to each of the fan drive electric motors 62A-B individually, separately and/or proportionally as needed to provide power to rotate the corresponding fan section 22. It should be appreciated, that although two gas turbine engines are shown and described by way of example, that other multiples of gas turbine engines 20A-B could be utilized including three engines, four engines or more.

The example controller 68 includes an aircraft controller 116 that receives information from a first full authority digital engine controller (FADEC) 112A of the first engine 20A and a second FADEC 112B of the second engine 20B. The example aircraft controller 68 may include a first motor controller portion 114A and a second motor controller portion 114B. The controller 68 utilizes operational information obtained from each of the first and second engines 20A-B to balance electric power provided to each of the fan drive electric motors 66A-B. Power is provided through the electric network 132 that includes electrical power communication buses 120A-B for each generator 64A-B and electric power communication buses 118A-B for each fan drive electric motor 66A-B. The example electric power network 132 is shown and illustrated in this disclosed example schematically and include the electrical and control connections required to transfer power from the generators 64A-B to the fan drive electric motors 66A-B as is understood by those understanding electric motor and generator operation.

Figure 3:
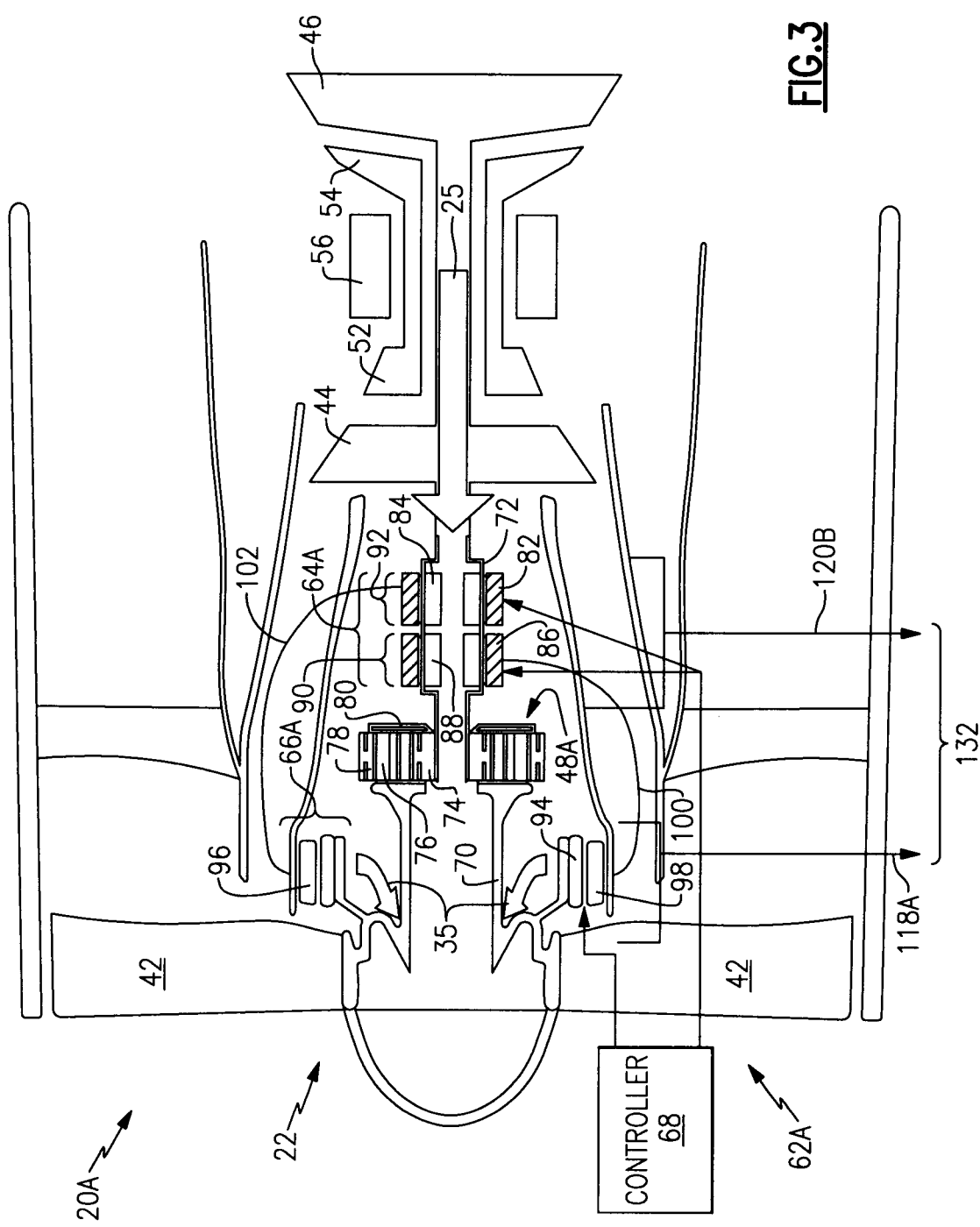
FIG. 3 is a schematic view of a fan drive system of one engine of the aircraft propulsion system.

Referring to FIG. 3 with continued references to FIG. 2, the first gas turbine engine 20A is shown schematically separate from the entire propulsion system 250 to illustrate and explain operation of the electric fan drive system 62A. Each fan drive system 62A-B for each engine 20A-B operates in this disclosed example in the same manner.

The fan drive system 62A receives a primary or first drive input 25 from the fan drive turbine 46. A supplemental or second drive input 35 is provided by the fan drive electric motor 66A. The supplemental drive input 35 provides additional power to the fan section 22 to, among other possible things, accommodate variations in power output through the first drive input 25. The example fan drive system 62A exploits the speed relationship between the input shaft 72 and the fan shaft 70 inherent in the gear system 48A. The relative speeds and pole counts of the electric motor 66A and the generator 64A are made complimentary to provide a parallel electric power path to drive the fan section 22.

The relationships between the speeds of the input shaft 72 relative to the fan shaft 70 along with the pole counts are common between each of the engines 20A-B of the propulsion system 250 shown in FIG. 2. In other words, the number of rotors, pole counts of the first generator 64A not only corresponds with the first motor 66A of the first engine 20A, but also the second motor 66B of the second engine 20B. Similarly, the second generator 64B is configured to include a number of rotors and pole counts that correspond with both the first motor 66A and the second motor 66B. The common configuration between motors 66A-B and the generators 64A-B is provided by utilizing the same gear systems 48A and enables cross operation between engines 20A-B.

The example fan drive electric motor 66A is mounted directly to a fan shaft 70 driven by the geared architecture 48A. The geared architecture 48A includes a sun gear 74 driven by the input shaft 72 driven by the low pressure turbine 46. The sun gear 74 drives intermediate gears 76 supported by a carrier 80. The intermediate gears 76 rotate within a ring gear 78 that is fixed to the engine static structure 36. The carrier 80 is coupled to drive the fan shaft 70. The disclosed geared architecture 48 may be referred to as a planetary gear system and provides a speed reduction ratio between the input shaft 72 and the fan shaft 70 that is equal to 1+ the gear ratio. In this example, the geared architecture 48 has a gear ratio of three (3.0) and therefore the speed reduction is 1+3.0=4.0.

Although a specific mounting configuration is disclosed by way of example, the fan drive electric motor 66 may be mounted in an alternate configuration that maintains the relative speed relationship the fan shaft 70 and the input shaft 72 and remain within the contemplation and scope of this disclosure.

The example fan drive electric motor 66 includes a permanent magnet rotor 94 mounted to drive the fan shaft 70. A first stator phase 98 and a second stator phase 96 are fixed relative to the rotor 94 on a portion of the engine static structure 36. The electric motor 66 is driven directly by electric power produced by the generator 64. The number and configuration of phases are disclosed by way of example and other numbers of phases as understood for electric motor and generator operation are within the contemplation and scope of this disclosure.

The example generator 64A includes a first generator portion 92 and a second generator portion 90. In this disclosed example, the first generator portion 92 is spaced axially apart from the second generator portion 90. Each of the generator portions 92, 90 provide power to a corresponding one of the first and second stator phases 96, 98 of the fan drive electric motor 66. A controller 68 controls the communication of electric power from the generator portion 92, 90 to the electric motor 66.

Figure 4:
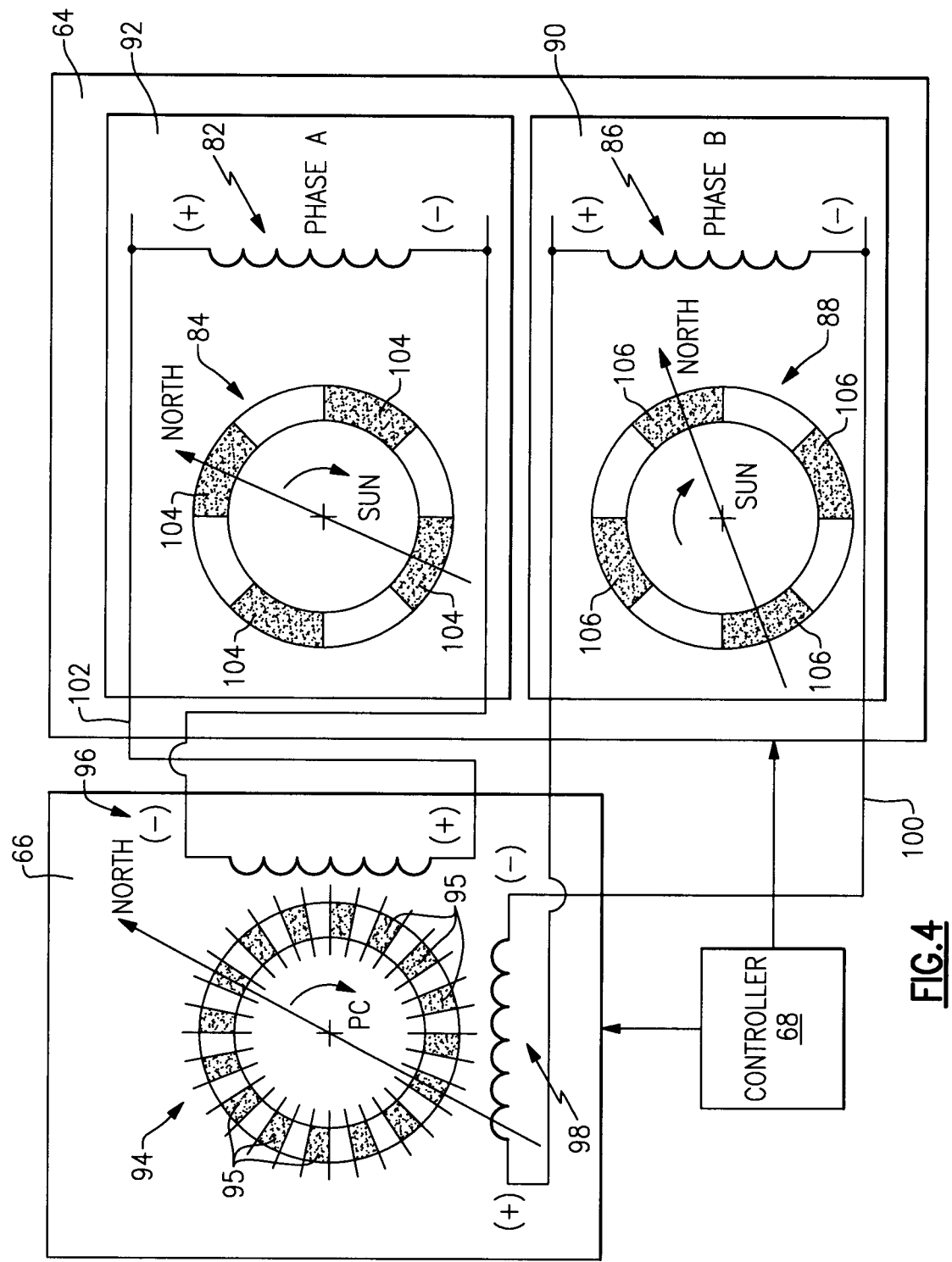
FIG. 4 is a schematic view of components of the example fan drive system.

Referring to FIG. 4, with continued reference to FIG. 3, the first generator portion 92 includes a first rotor 84 mounted to an input shaft 72. The input shaft 72 is driven by the fan drive turbine that in this example is the low pressure turbine 46. The second generator portion 90 includes a second rotor 88 that is also mounted to the input shaft 72.

The first rotor 84 includes a plurality of poles 104. Each of the poles 104 is a permanent magnet. In this example, four poles 104 are provided. The second rotor 88 includes a second plurality of poles 106. The second plurality of poles 106 includes four poles that are clocked relative to the first plurality of poles 104. In this disclosure the term clocked is utilized to describe the circumferential offset between the first set of poles 104 and the second set of poles 106. In this example, the second set of poles 106 is clocked 90 degrees relative to the first set of poles 104.

The relative radial clocking along with the number of poles in each of the first and second stators 86, 82 is combined with the relative speeds between the input shaft 72 and the fan shaft 70 to provide the required commutation between the first and second stator phases 98, 96. In this disclosed example and as discussed above, the speed reduction ratio between the speed of the input shaft 72 and the speed of the fan shaft 70 is four (4.0). The number of poles in each of the first and second stators 86, 82 is therefore four or a multiple of four to provide the corresponding commutation. Moreover, each of the stators 86, 82 will include more poles than that provided on the corresponding rotor 88, 84.

The rotor 94 of the fan drive electric motor 66 includes a plurality of poles 95. Each of the poles 95 is a permanent magnet. In this example, sixteen (16) poles are indicated. The number of permanent magnet poles 95 is four times (4×) the number of poles 104 of the first rotor 84 and four times the number of poles 104 of the second rotor 88 as the speed reduction ratio between the input shaft 72 and the speed of the fan shaft 70 is four (4.0). The number of poles of the first stator phase 98 is the same as the number of poles of first stator 86. The number of poles of the second stator phase 96 is the same as the number of poles of the second stator 82. Although depicted as two phases in the disclosed non limiting embodiment it should be understood that the concepts described herein are not limited to two phases as the teaching may be applied to other electric machine phase configurations including three or more phases in the generator 64 and motor 66 with pole counts commensurate with the speed reduction ratio of the geared architecture 48. As appreciated, for different gear ratios, different numbers of poles would be utilized to provide the required commutation to drive the electric motor 66.

Each generator portion 92, 90 provides the required phase shift needed to turn the rotor 94 of the fan drive electric motor 66. The relative clocking between the generator rotors 88, 84 and the motor rotor 94 combined with the relative speeds of the fan shaft 70 and the input shaft 72 provide a mechanical commutation. Accordingly, an electronic controller or commutator is not necessary to control operation of the motor 66. The controller 68 is provided to selectively turn the electric motor 66 on and off and to adjust an amount of power supplied, but is not utilized in this example embodiment as a commutator.

In operation, the generator 64 rotates with the input shaft 72. The input shaft 72 drives the geared architecture 48 to provide a first or primary rotational input to the fan shaft 70 and thereby the fan section 22. The fan shaft 70 is rotated at a second speed that is different and, in this example, less than a first speed of the input shaft 72. The generator 64 provides a first phase of electric power schematically indicated at 100 to the first stator phase 98 of the electric motor 66. A second phase of electric power indicated at 102 is provided to a second phase 96 of the electric motor 66. Commutation between the generator stator phases 86, 82 is provided by relative clocking between the generator phases combined with the relative speed between the input shaft 72 and the fan shaft 70. The first stator phase 86 of the generator 64 provides power to the first stator phase 98 of the electric motor 98. The second stator phase 82 provides power to the second stator phase 96 ninety degrees apart from the first stator phase 86 to provide the required commutation drive the rotor 94. Although depicted as two phases in the disclosed non limiting embodiment it should be understood that the concepts described herein are not limited to two phases as the teaching may be applied to other electric machine phase configurations including three or more phases in the generator 64 and motor 66.

The supplemental input 35 provided by the electric motor 66 is implemented responsive to variable load demand on the fan drive turbine 46. The supplemental power input 35 provided by the motor 66 increases the load on the fan drive turbine 46 necessary to meet the decreased load needed to maintain the desired fan speed and propulsive output. Additionally, the supplemental input 35 can be disengaged to reduce power on the fan drive turbine 46 when a demanded load is increased.

The controller 68 governs operation of the fan drive system 62 and engagement of the supplemental input 35. The controller 68 can be a separate controller 68 or part of the overall engine and/or aircraft controller.

Figure 5:
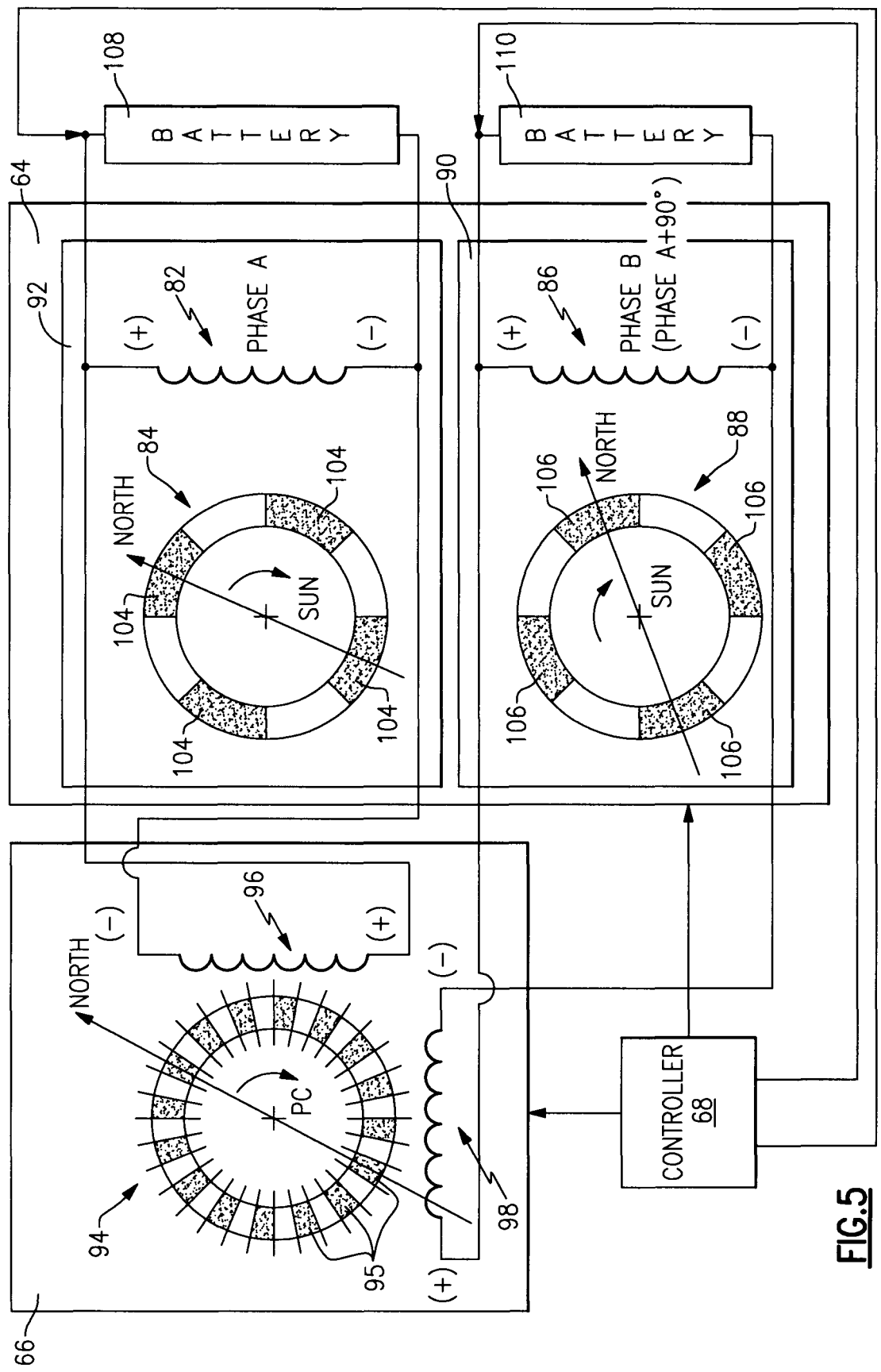
FIG. 5 is a schematic view of components of another example fan drive system.

Referring to FIG. 5 with continued reference to FIGS. 3 and 4, first and second batteries 110 and 108 are electrically coupled to the corresponding first and second generator portions 92, 90. The batteries 110 and 108 can supplement generated power and also enable storage of electric power not used to drive the electric motor 66. The supplemental power input 35 provided to the electric motor 66 by battery 110 and battery 108 is implemented responsive to variable load demand on the fan drive turbine 46. The supplemental power input 35 provided by the battery 110 and battery 108 decreases the load on the fan drive turbine 46 necessary to meet the increased load needed to maintain the desired fan speed and propulsive output. Additionally, the supplemental input 35 can be engaged to reduce power on the fan drive turbine 46 when a demanded load is increased.

Figure 6:
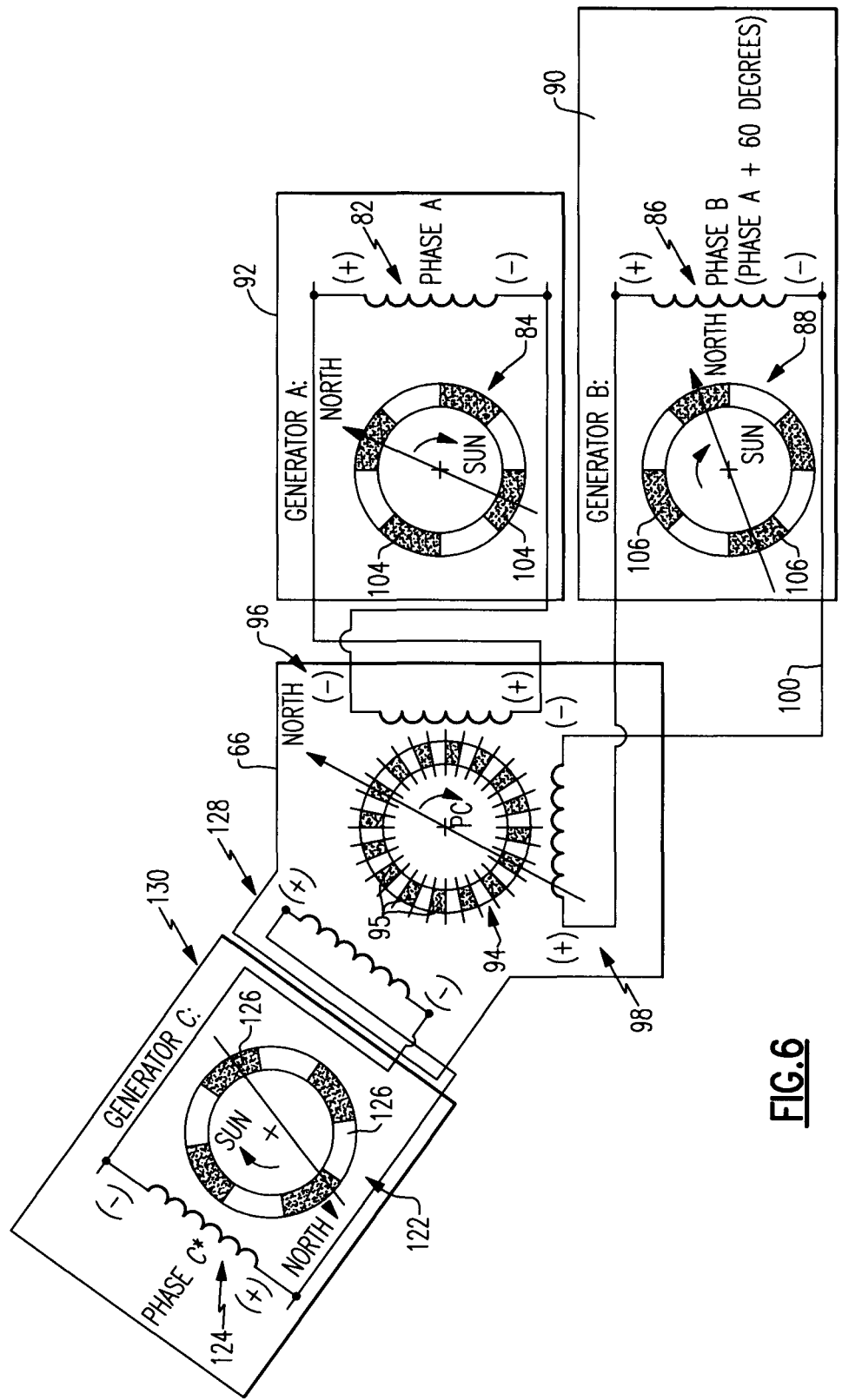
FIG. 6 is a schematic view of components of yet another example fan drive system.

Referring to FIG. 6, a third generator portion 130 is shown to provide a third phase to drive the fan drive electric motor 66. The third generator portion 130 includes a third rotor 122 with a third set of poles 126. A third stator 124 is provided to communicate to a third phase 128 of the electric motor 66. The third rotor 122 is spaced axially apart along the input shaft 72 next to the first and second rotors 88, 84. The first, second and third rotors 88, 84 and 130 are clocked relative to each to provide the necessary commutation to drive the rotor 94 of the electric motor 66. As appreciated, a three phase generator and/or electric motor includes phases that are separated by sixty degrees. As with the previous example generator and electric motor examples, the number of poles in each of the first, second and third rotors 88, 84 and 130 are determined relative to the different speeds provided by the geared architecture 48 to provide the required commutation mechanically by the relative physical structures instead of using an electrical commutation controller. The different speeds of the input shaft and output shaft provided by the geared architecture are utilized to simplify the generation and distribution of power.

Figure 7:
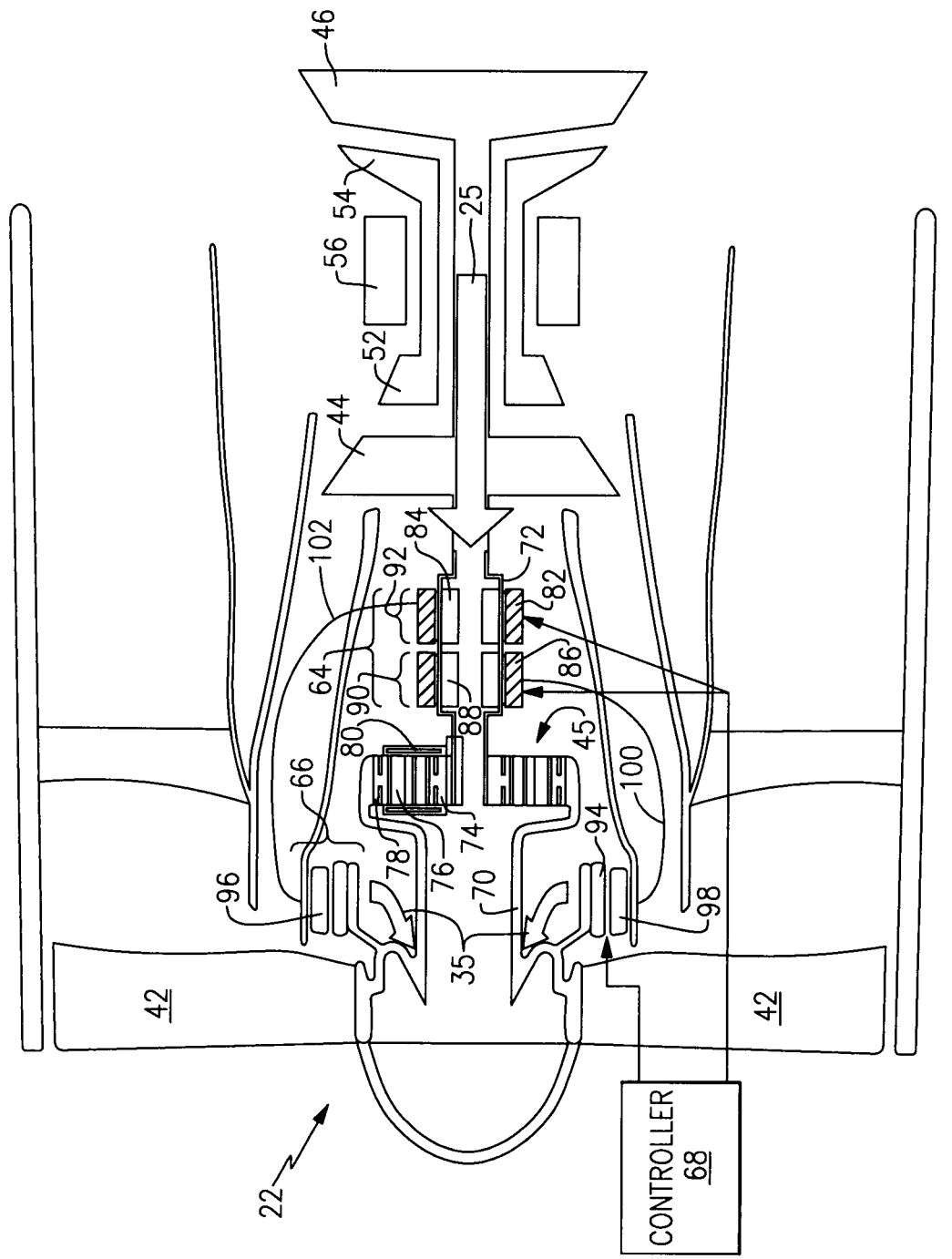
FIG. 7 is a schematic view of another example fan drive system.

Referring to FIG. 7, with continued reference to FIGS. 4 and 5, another embodiment of the fan drive system 62 includes another geared architecture 45 that is configured such that the fan shaft 70 is coupled to the ring gear 78. The example geared architecture 45 is sometimes referred to as a "star" gear system. The geared architecture 45 provides a speed reduction ratio between the shaft 72 and the fan shaft 70 that is equal to the gear ratio. In this example, the geared architecture 45 has a gear ratio of three (3.0) and therefore the speed ratio is 3.0. The number of permanent magnet poles 95 is three times (3×) the number of poles of the first rotor 84 and three times the number of poles of the second rotor 88 as the speed reduction ratio between the input shaft 72 and the speed of the fan shaft 70 is three (3.0). The number of poles of the first stator phase 98 is the same as the number of poles of first stator 86. The number of poles of the second stator phase 96 is the same as the number of poles of the second stator 82. The number of poles in each of the first and second stators 86, 82 is therefore three or a multiple of three to provide the corresponding commutation.

In the geared architecture 45, the fan shaft 70 is driven in an opposite direction compared to the input shaft 72 and therefore a phase shift of power provided by the first and second generators 92, 90 is required to provide proper rotation of the motor 66. The voltage polarity across first stator phase 98 of the electric motor 66 is connectively inverted. The voltage polarity of the second phase of electric power indicated at 102 is connected inverted in polarity to the second phase 96 of the electric motor 66.

Implementation of supplemental power input 35 opposes the rotation of fan blades 42. The voltage polarity across first stator phase 98 of the electric motor 66 is as shown in FIG. 3. The voltage polarity of the second phase of electric power indicated at 102 is connected with indicated polarity to the second phase 96 of the electric motor 66 as shown in FIG. 3. The supplemental input 35 provided by the electric motor 66 is implemented responsive to variable load demand on the fan drive turbine 46. Disengaging the supplemental input 35 removes the torque provided by electric motor 66 that opposes rotation of fan blades 42 and increases a reduction of power on the fan drive turbine 46 when a demanded load is increased.

Figure 8:
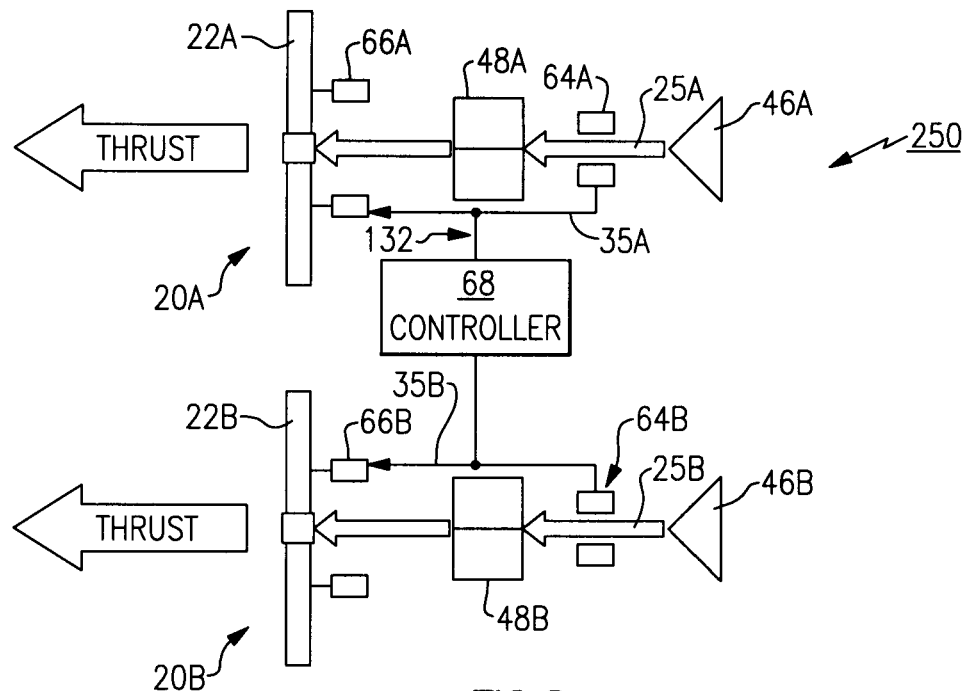
FIG. 8 is a schematic view of one example operating mode of the example aircraft propulsion system.

Referring to FIG. 8 with continued reference to FIG. 2, the disclosed aircraft propulsion system 250 is operable to balance power loads between each of the engines 20A-B to reduce the load on the fan drive turbine 46 and to accommodate operating imbalances between engines. The electrical network 132 enables communication of power between any of the first and second generators 64A-B and each of the motors 66A. The communication pathway provided by the electric network 132 enables operation of the fan drive electric motors 66A-B with power from either or both of the generators 64A-B completely or in a proportional manner.

During operation the fan drive turbine 46A-B of each of the engines 20A-B provides a first primary drive input 25 is provided by the fan drive turbine 46A-B of each of the engines 20A-B. The primary drive input 25 drives the geared architecture 48A-B that in turn rotates that fan 22A-B at speed determined by the gear ratio. The fan drive turbine 46A-B also drive the generators 64A-B that produce electric power to drive the corresponding fan drive electric motors 66A-B. The fan drive electric motors 66A-B provide a supplemental power input schematically indicated by arrows 35A-B.

In one example method of operating the disclosed aircraft propulsion system 250, both engines 20A-B are operating substantially the same. In this example, substantially the same means that both fan drive turbines 46A-B are providing a primary drive input 25 for a similar input that is substantially the same. The input for the fan drive turbines 46A-B correspond with fuel being burned. In the example shown in FIG. 8, both fan drive turbines 46A-B are generating the same power output given the same fuel input. As appreciated, the same operation is within expected tolerances and is not identical. Each of the generators 64A-B provide a supplemental input 35A-B to the corresponding fan drive electric motors 66A-B in order to provide the total thrust produced by the engine 20A-B. The total thrust is the propulsive thrust generated by the engine 20A-B as is understood by those skilled in the art. In this example, the thrust is produced by rotation of the fan 22A-B without consideration of the thrust produced by exhaust from the fan drive turbine 46A-B. In this example disclosed in FIG. 8, the first primary drive input 25A-B and the second supplemental input 35A-B are substantially the same within an expected range to produce a common amount of thrust.

Figure 9:
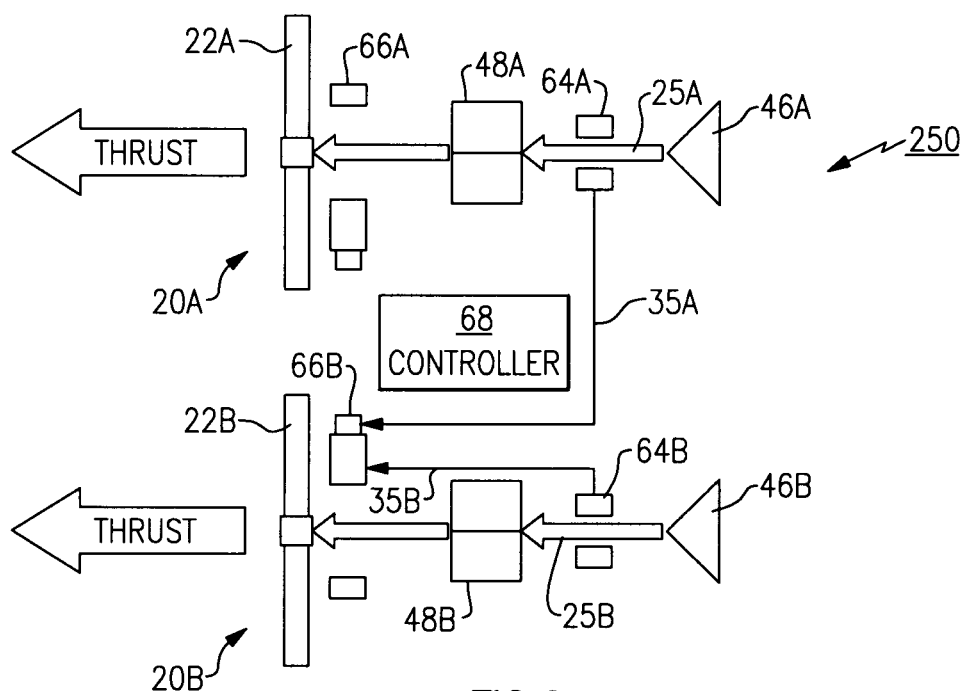
FIG. 9 is a schematic view another example operating mode of the example aircraft propulsion system.

Referring to FIG. 9, the engines 20A-B are shown schematically and differ in efficiencies such that the fan drive turbine 46B does not generate the same power as compared to the fan drive turbine 46A of the first engine 20A for the same given input. Accordingly, without a means to supplement power provided to the fan 22B, additional input would be needed to provide a balance thrust between both engines 20A-B. The additional input is added fuel flow through the combustor to drive the turbine 46B at the increased power levels needed to provide balance between the engines 20A-B. However, because the generators 64A-B and motors 66A-B are coupled electrically, power from the first engine 20A can be transferred to the second engine 20B to provide an increased amount of supplemental power 35 to power the fan 22B without providing additional input to the fan drive turbine 46B. In this example, the supplemental input 35A from the first generator 64A is combined with the supplemental input 35B from the second generator 64B to increase the additional power to the electric motor 66B. The additional supplemental power provided by both supplemental inputs 35A-B can enable balanced thrust production without increasing fuel flow to the fan drive turbine 46B.

It should be appreciated, that although the disclosed example is described as providing all power from both generators 64A-B, any partial portion of power from both generators 64A-B could be utilized and controlled by the controller 68 to balance loads and provide the desired thrust balance between the engines 20A-B.

Accordingly, the example aircraft propulsion system 250 includes the electric network 132 that enables power to be controlled and directed between generators of different engines as needed to balance operation across multiple engines. The parallel inputs of power through the geared architecture 48 and the electric motor 66 enables the application of power to the fan section 22 to smooth variations in low pressure compressor power fluctuations and lag while also reducing dependence on compressor bleed to match compressor operation.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
a first gas turbine engine including a first input shaft driving a first gear system, a first fan driven by the first gear system through a first fan shaft, a first generator supported on the first input shaft and a first fan drive electric motor supported on the first fan shaft providing a drive input to the first fan, wherein the first fan shaft rotates at a speed different than the first input shaft;
a second gas turbine engine including a second input shaft driving a second gear system, a second fan driven by the second gear system through a second fan shaft, a second generator supported on the second input shaft and a second fan drive electric motor supported on the second fan shaft providing a drive input to the second fan, wherein the second fan shaft rotates at a speed different than the second input shaft, each of the first generator and the second generator includes a first rotor and a second rotor, the first rotor is supported on the corresponding one of the first input shaft and the second input shaft and includes a first set of poles providing power to a first phase of a corresponding one of the first fan drive electric motor and the second fan drive electric motor and the second rotor includes a second set of poles providing power to a second phase of the corresponding one of the first fan drive electric motor and the second fan drive electric motor, and wherein each of the first fan drive electric motor and the second fan drive electric motor includes a rotor supported on a corresponding one of the first fan shaft and the second fan shaft, the first set of poles and the second set of poles are clocked relative to each other such that rotation of the corresponding one of the first input shaft and the second input shaft combined with the difference in relative speeds with a corresponding one of the first fan shaft and second fan shaft commutates the first phase and the second phase to drive the rotor for the corresponding one of the first fan drive electric motor and the second fan drive electric motor;

at least one battery electrically coupled to and charged by at least one of the first generator and the second generator; and a controller controlling power output from each of the first generator and the second generator and directing the power output between each of the first fan drive electric motor, the second fan drive electric motor and the at least one battery.

2. The aircraft propulsion system as recited in claim 1, wherein the first gear system and the second gear system provide a main drive input to a corresponding one of the first fan and the second fan and the first fan drive electric motor and the second fan drive electric motor provide a supplemental drive input to at least one of the first fan and the second fan.

3. The aircraft propulsion system as recited in claim 1, wherein the controller is configured to balance power generated by both the first generator and the second generator between the first fan drive electric motor and the second fan drive electric motor responsive to an imbalance between a main drive input of one of the first gas turbine engine and the second gas turbine engine.

4. The aircraft propulsion system as recited in claim 3, wherein the controller is configured to direct power generated by each of the first generator and the second generator independent of the other of the first generator and the second generator to one or both of the first fan drive electric motor and the second fan drive electric motor.

5. The aircraft propulsion system as recited in claim 1, wherein each of the first fan drive electric motor and the second fan drive electric motor include a permanent magnet rotor mounted to a corresponding one of the first fan shaft and the second fan shaft, the permanent magnet rotor including a plurality of poles corresponding with the first set of poles and the second set of poles of both the first generator and the second generator.

6. The aircraft propulsion system as recited in claim 5, wherein each of the first gear system and the second gear system are configured to provide a ratio between an input speed of a corresponding one of the first input shaft and the second input shaft and an output speed of the corresponding first fan shaft and the second fan shaft and the commutation of the plurality of poles of the first fan drive motor and the second fan drive electric motor corresponds with the gear ratio and the number of poles in each of the first set of poles and the second set of poles.

7. The aircraft propulsion system as recited in claim 1, wherein for each of the first generator and the second generator, the first rotor is spaced axially apart from the second rotor on the corresponding one of the first input shaft and the second input shaft.

8. The aircraft propulsion system as recited in claim 6, wherein each of the first generator and the second generator includes a third rotor including a third set of poles and each of the first fan drive electric motor and the second fan drive electric motor includes poles corresponding to each of the first set of poles, the second set of poles and the third set of poles of each of the first generator and the second generator.

9. An aircraft propulsion system comprising
at least two gas turbine engines each including,
a fan driven by a fan shaft rotatable about an engine axis,
a fan drive electric motor providing a supplemental drive input to the fan,
a gear system driven by an input shaft and coupled to the fan shaft to provide a main drive input for driving the fan, and
a generator driven by the input shaft configured to generate electric power and for driving the fan drive electric motor, wherein the generator includes a first rotor, a first stator, a second rotor, the first rotor is supported on the input shaft and includes a first set of poles providing power to a first phase of fan drive electric motor and the second rotor includes a second set of poles providing power to a second phase of the fan drive electric motor, and
wherein the fan drive electric motor includes a rotor supported on the fan shaft, the first set of poles and the second set of poles are clocked relative to each other such that rotation of the input shaft combined with a difference in relative speeds with the fan shaft commutates the first phase and the second phase to drive the rotor for the fan drive electric motor;
at least one battery electrically coupled to the generator, wherein the generator provides electric power to charge the at least one battery; and
a controller controlling power output from the generator of each of the at least two gas turbine engines and directing power to at least one fan drive electric motor of the at least two gas turbine engines.

10. The aircraft propulsion system as recited in claim 9, wherein the generator includes a third rotor including a third set of poles providing electric power to a third phase of the fan drive electric motor and, wherein the first set of poles, the second set of poles and the third set of poles are clocked relative to each other such that rotation of the input shaft commutates the first phase, the second phase and the third phase of the fan drive electric motor.

11. The aircraft propulsion system as recited in claim 9, wherein the gear system is configured to provide a ratio between an input speed of the input shaft and an output speed of the fan shaft and commutation of the first set of poles and the second set of poles of the fan drive electric motor corresponds with the gear ratio and the number of poles in each of the first set of poles and the second set of poles.

12. The aircraft propulsion system as recited in claim 9, wherein the controller is configured to balance power generated by the generator of each of the at least two gas turbine engines to distribute electric power between the fan drive electric motor of each of the at least two gas turbine engines responsive to an imbalance between the main drive input of one of the at least two gas turbine engines.

* * * * *